Feb. 11, 1936.   R. E. CUSHING   2,030,811
PROCESS FOR MAKING AMMONIUM SALTS
Filed Dec. 16, 1933
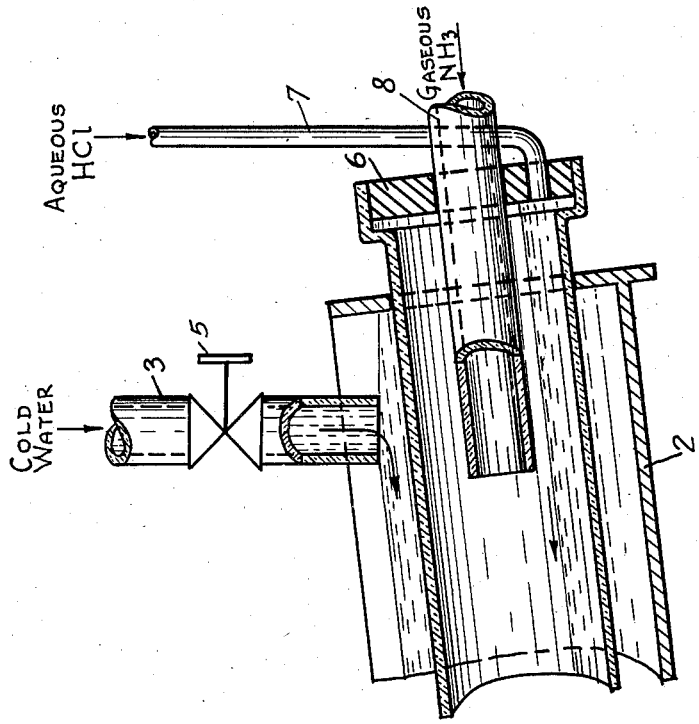
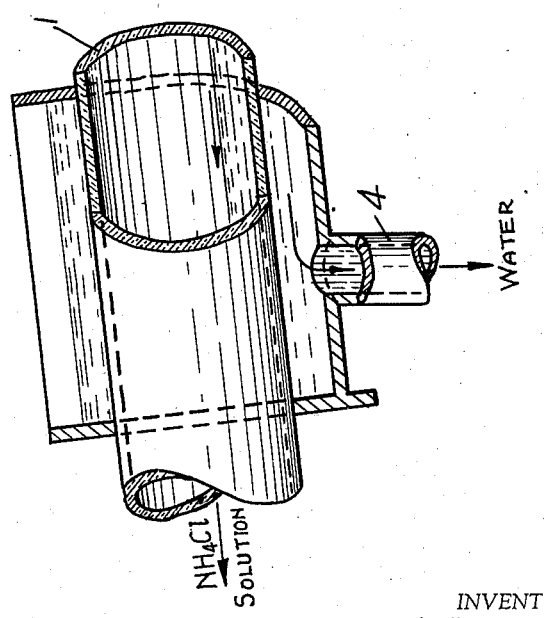
INVENTOR.
RUSSELL E. CUSHING
BY Charles W. Rivise
A. D. Caesar
ATTORNEYS.

Patented Feb. 11, 1936

2,030,811

UNITED STATES PATENT OFFICE 2,030,811

PROCESS FOR MAKING AMMONIUM SALTS

Russell E. Cushing, Haddonfield, N. J., assignor to Pennsylvania Salt Manufacturing Co., Philadelphia, Pa., a corporation of Pennsylvania Application December 16, 1933, Serial No. 702,712

13 Claims. (Cl. 23—100)

The present invention relates to the manufacture of ammonium salts, and particularly to the manufacture of ammonium salts of volatile acids. The invention will be described with specific reference to ammonium chloride, though other salts such as ammonium sulphide, ammonium acetate and ammonium carbonate fall within the purview of the invention.

Various methods have been proposed in the prior art for the preparation on a commercial scale of ammonium chloride. One of these methods consists in passing gaseous hydrochloric acid into an aqueous solution of ammonia and concentrating the resulting liquid. Another consists in simultaneously conducting hydrochloric acid gas and gaseous ammonia into a solution of ammonium chloride. In both of these methods as in the others of the prior art dense clouds of ammonium chloride vapors or "smoke" are produced by the heat of the reaction. In the latter method, as the temperature of the ammonium chloride solution rises, its ability to absorb the gases is reduced until the boiling point is reached when the gases pass through the liquid without being absorbed at all. The reagents then react in a vapor phase producing the vapors of ammonium chloride.

Terwelp in German Patent No. 374,764 suggests that the vapors of ammonium chloride together with the steam produced by the heat of the reaction be allowed to escape to a cooler and that the condensate be conducted from the cooler back to the reaction chamber to enrich the reaction mixture. However, this is much easier said than done, for the vapors of ammonium chloride can be condensed only with difficulty. Furthermore, there are other drawbacks to Terwelp's method which renders it impracticable for commercial operation.

The primary object of the present invention is to provide a method for producing an ammonium salt and particularly ammonium chloride under such conditions as to minimize or to eliminate entirely the formation of vapors of the ammonium salt and the consequent loss of the reagents and of the product.

Another object is to provide a suitable form of apparatus for most effectively carrying out the method.

The invention is based in part upon the discovery or observation that the formation of ammonium chloride smoke can be prevented by carrying out the reaction between the ammonia and the acid in the absence of non-condensable gases. The non-condensable gases which are generally present in prior art methods of making ammonium chloride are water vapor above 100° at atmospheric pressure and air.

In one of its broad aspects, the method of the invention consists in bringing the reagents together in the absence of non-condensable gases and vapors.

In another of its broad aspects, the method of the invention consists in bringing the reagents together under such conditions as to promote a complete reaction between them.

In its preferred embodiment, the method consists in continuously conducting one of the reagents in the form of a concentrated solution through a long narrow tube, at the same time passing into the tube the other reagent in gaseous form, the reagents being passed into the tube in the ratio of their molecular weights and the tube being immersed in a cooling medium such as water, and continuously removing the resulting solution which contains the ammonium salt. Thus the reactor tube constitutes a chamber at atmospheric pressure in which the reaction between the reagents may take place continuously and to completion, the heat of reaction being removed by the cooling water and the loss of the reagents and of the product being prevented by the absence of non-condensable gases. By controlling the temperature a concentrated solution can be produced which upon cooling deposits crystals of the ammonium salt.

The single figure of the drawing is a diagrammatic representation, partly in cross-section and partly broken away, of a preferred form of apparatus for performing the process, and illustrating rather diagrammatically the steps of the process.

Referring to the drawing in greater detail, the reactor tube is designated by the numeral 1. The tube should be made of a material such as glass, stone ware, etc. which is fairly resistant to the corrosive effects of the reagents and product, and is advantageously disposed in a slightly inclined position to give the reaction mixture the advantages of gravity and to prevent backing up of the materials. The tube should be of relatively narrow bore and of considerable length to render certain that the reagents will be completely reacted by the time they reach the outlet. In practice I have found that the ratio of about 500 or over between the length and the internal diameter of the tube 1 produces satisfactory results. In a commercial installation I have obtained excellent results with a reactor tube 72 feet long and 1¼ inches in internal diameter.

The tube 1 is shown supported in any suitable manner in a long U-shaped trough 2 which may well be of wood. The trough is kept constantly filled with flowing cold water by means of the inlet pipe 3 and the outlet pipe 4. The inlet pipe is shown provided with a suitable form of valve 5. As illustrated, the two pipes 3 and 4 are so disposed in relation to the trough that the water will flow in the same direction as the reaction mixture. This makes for the most effective use of the cooling water as the hottest part of the reactor tube is always contacted by the coolest water.

In the commercial installation above referred to, it was found that the most satisfactory results were produced by passing sufficient cooling water through the trough to keep the temperature of the ammonium chloride solution leaving the outlet of the tube 1 down to about 75° C. A much higher temperature results in a loss of steam and vapors of ammonium chloride, while a much lower temperature causes the formation of crystals within the tube.

The higher or inlet end of the reactor tube is provided with the stopper 6 through which pass the hydrochloric acid tube 7 and the ammonia tube 8. Either the acid or the ammonia may be in gaseous form, but I prefer to use gaseous ammonia and aqueous hydrochloric acid. One reason is that it is much more difficult to obtain pure hydrochloric acid gas than ammonia. The hydrochloric acid tube 7 may terminate flush with the inner surface of the stopper, but the ammonia tube 8 should terminate beyond the position of the inlet pipe 3 to avoid undue rise of temperature when the reagents come together. In the commercial installation above referred to the tube 7 extends about fifteen inches into the reactor tube 1.

In order that the reaction between the ammonia and the hydrochloric acid shall proceed to completion, it is essential that they be present in the reactor tube in the ratio of their molecular weights; i. e. there should at all times be present 36.5 parts of anhydrous hydrochloric acid by weight to 17 parts of anhydrous ammonia. The rates of feed of the reagents should, therefore, be such as to insure this ratio throughout the tube, allowance being made, of course, for the water of solution of the hydrochloric acid and for the water vapor accompanying the ammonia. Preferably the rates of feed should be less than that necessary to keep the cross-section of the reaction tube full. In the drawing, the reaction liquid is shown as occupying only a small portion of the cross-section of the tube. In the commercial installation above referred to the acid feed was 5.095 pounds of 18° Bé. (27.92%) hydrochloric acid per minute. This corresponds to 1.423 pounds of anhydrous hydrochloric acid per minute. Runs were made with acids of both lower and higher strengths than 18° Bé., but in this particular installation the use of an acid much higher than 22° Bé. appeared to cause the formation of crystals of ammonium chloride within the tube. The ammonia feed was 14.87 cubic feet of anhydrous ammonia per minute at 20° C. corresponding to .661 of a pound of anhydrous ammonia per minute.

In starting up the process, the ammonia may be started first to sweep out all the air. The presence of air is one of the causes for the formation of the ammonium chloride vapors. However, if the process is started in the presence of air or water vapor above 100° C., the condition soon corrects itself as continuation of the process sweeps out the non-condensable gases including all the ammonium chloride vapors which may be formed. This is one of the many advantages of my process and apparatus.

In the commercial installation previously referred to, the liquid leaving the outlet of the reactor tube 1 contained about 380 grams of ammonium chloride per litre of solution having a crystallization temperature of 57° C. If 20° Bé. acid is used, the amount of ammonium chloride per litre of solution at the outlet is about 400 grams. The production of solid ammonium chloride was 2.084 pounds per minute or 3000 pounds per twenty-four hours. Apparently the ammonia and hydrogen chloride in my process react continuously and according to the equation $$NH_3 + HCl = NH_4Cl$$

to give the theoretical yield of ammonium chloride.

The foregoing constitutes the essential and distinctive thought of my improved process and the apparatus by means of which I prefer to carry out its steps, but it will, of course, be understood that the same may be combined with various other steps or details and that changes and modifications may be resorted to without affecting the peculiar results obtained and without departing from the spirit of the invention or the scope of the appended claims, in which I intend to claim all novelty inherent in my invention which is permissible in view of the prior art. It will, further, be understood that my invention is not dependent upon any explanations or theories which have been set forth as descriptive of the actions or reactions involved, nor dependent upon the soundness or accuracy of any theoretical statements so advanced.

I claim:

1. A method of preparing ammonium salts from ammonia and the corresponding acid, which consists in causing a stream of one of the reagents in concentrated solution to flow continuously through a long narrow tube, passing the other reagent in gaseous form continuously into the tube above the stream of the other reagent and cooling the outside of the tube to reduce the temperature of the reaction mixture as it travels toward the outlet of the tube.

2. The method defined in claim 1, wherein the ammonium salt is ammonium chloride and the acid is hydrochloric acid.

3. A method of preparing ammonium salts from ammonia and the corresponding acid which consists in causing a stream of the concentrated acid to flow continuously through a long narrow tube, causing gaseous ammonia to pass continuously into said tube above said stream of acid and cooling the outside of the tube to reduce the temperature of the reaction mixture as it travels toward the outlet of the tube.

4. The method defined in claim 3, wherein the ammonium salt is ammonium chloride and the acid is hydrochloric acid.

5. A method of preparing ammonium salts from ammonia and the corresponding acid which consists in simultaneously passing a continuous stream of gaseous ammonia and a continuous stream of concentrated acid into a long narrow tube in the proportions and at the rate necessary to bring about a complete reaction of the ammonia and the acid and continuously removing the concentrated solution of the resulting ammonium salt.

6. The method defined in claim 5, wherein the salt is ammonium chloride and the acid is hydrochloric acid.

7. The method defined in claim 5, wherein the heat of reaction is removed by keeping the tube immersed in cold water.

8. A method of preparing ammonium chloride from ammonia and hydrochloric acid, which consists in continuously passing one of said reagents in aqueous solution and the other in gaseous form through an elongated reaction chamber of small cross-sectional area compared with its length.

9. A method of preparing ammonium salts from ammonia and a volatile acid, which consists in continuously passing one of said reagents in aqueous solution and the other in gaseous form through an elongated reaction chamber of small cross-sectional area compared with its length and continuously removing the heat of reaction.

10. A method of preparing ammonium chloride from ammonia and hydrochloric acid, which consists in continuously passing the hydrochloric acid in aqueous solution and the ammonia in gaseous form through an elongated reaction chamber of small cross-sectional area compared with its length and continuously removing the heat of reaction.

11. The method defined in claim 8, the reagents being present in the reaction chamber in the ratio of their molecular weights.

12. The method defined in claim 9, the reagents being present in the reaction chamber in the ratio of their molecular weights.

13. The method defined in claim 10, the reagents being present in the reaction chamber in the ratio of their molecular weights.

RUSSELL E. CUSHING.